United States Patent [19]
Gierth

[11] Patent Number: 5,984,600
[45] Date of Patent: Nov. 16, 1999

[54] BROACHING MACHINE

[76] Inventor: Christian Gierth, Wasserburg Str. 62, D-58809 Neuenrade, Germany

[21] Appl. No.: 09/148,596

[22] Filed: Sep. 4, 1998

[30] Foreign Application Priority Data

Sep. 8, 1997 [DE] Germany ............................ 197 39 315

[51] Int. Cl.$^6$ .................................................. B23D 41/06
[52] U.S. Cl. ........................... 409/269; 409/271; 409/285
[58] Field of Search ..................................... 409/264, 265, 409/266, 267, 269, 270, 271, 285

[56] References Cited

U.S. PATENT DOCUMENTS

| 2,292,440 | 8/1942 | Gotberg | 409/264 |
| 2,529,705 | 11/1950 | Pataki et al. | 409/269 |
| 3,103,852 | 9/1963 | Bonnafe | 409/264 |
| 3,221,608 | 12/1965 | Anthony | 409/264 |
| 5,833,411 | 11/1998 | Holstein et al. | 409/269 |

OTHER PUBLICATIONS

"Broaching Machines" ("Räum Maschinen") published in 1988 by Hönnema GmbH, Am Stadtwald 8, Wickede, pp. 1–12.

Primary Examiner—Andrea L. Pitts
Assistant Examiner—Adesh Bhargava
Attorney, Agent, or Firm—Collard & Roe, PC

[57] ABSTRACT

The invention relates to a broaching machine comprised of a machine table for receiving a workpiece and being mounted in a machine frame. There is a platform which is driven so as to be displaceable relative to the table, as well as of one or more of axially operating broaching tools, which can be coupled with the platform. The machine table and the platform are displaceable in oppositely oriented directions. The machine table and platform are preferably driven via a common spindle drive. The spindles have two oppositely oriented threaded sections and the machine table and platform each are mounted on one of the two oppositely oriented threaded sections for a driving connection.

4 Claims, 5 Drawing Sheets

BROACHING MACHINE

BACKGROUND OF THE INVENTION

1. Field of the Invention

The invention relates to a broaching machine comprising a machine table receiving the workpiece, a platform, which is driven and displaceable by a drive relative to the machine table, as well as one or a plurality of broaching tools, which can be coupled with the platform and which work in the axial direction. The machine is mounted on a machine frame.

2. The Prior Art

Broaching machines for machining the inside and outside of workpieces, such as for producing grooves, toothings or the like, are known from the printed document "Broaching Machines" published in 1988 by the firm Hönnema GmbH, Am Stadtwald B, Wickede. In detail, this broaching machine comprises a vertical arrangement, having a machine frame for a machine table that receives the workpiece horizontally. Below the machine table, there is a platform, which is displaceable via a spindle drive, and which can be coupled with one or more broaching tools in the form of broaching spindles, which grip through the table. In their operating positions, the end side shafts of the relatively long broaching tools are received in a shaft holder on the platform, in a pliers-like manner. The shaft of the broaching tools is adjoined by an insertion section which is adjoined by the actual broaching section supporting the cutters. The other end of the broaching tool may be detachably received in an end-piece holder on the frame of the machine.

Broaching work of this type requires that the broaching tool have a great working length. Therefore, the broaching tool must be displaced through the workpiece and the table via the platform over a long distance. The lift of the platform is therefore extensive, and the machine is required to have a great structural height. This necessarily results in a great operating height for working the workpiece which has to be placed or advanced on the table. These broaching machines therefore have to be equipped with either suitably dimensioned operating pits or operating platforms.

The lengths required for the broaching tools require long spindle drives. However, the spindles of the spindle drive, which are supported on their end-sides, with the platform being mounted on and driven by the spindle drive, permit only limited rotary speeds and thus limit the speed of the platform, because vibration is caused in the spindle drive when a certain speed is exceeded. These vibrations decrease the operating accuracy of the machines.

SUMMARY OF THE INVENTION

It is therefore an object of the invention to reduce the structural volume of broaching machines of the type specified above.

It is another object of the invention to provide a broaching machine that optimizes the operating speed both during machining and set-up.

These and other objects are accomplished by a broaching machine comprising a machine frame, a machine table for receiving a workpiece mounted on the machine frame, a platform mounted to the frame and displaceably driven relative to the machine table, and at least one broaching tool connected to the platform and operating in the axial direction. The machine table and platform are driven in opposite directions. Such broaching machines may be made according to the invention in both vertical and horizontal arrangements.

The oppositely oriented drive or movement of the machine table and platform reduces the required relative spacing of the machine table and platform during machining and thus also reduces the height or length of the a broaching machine. The table and platform may have separate drives or may share a common drive. The oppositely oriented movements of the machine table and platform permit higher speeds both as the workpiece is being machined and when the table and the platform are driven back into their starting positions.

In a preferred embodiment, the broaching machine has a common spindle drive. Oppositely directed movements of the table and the platform have particularly favorable effects in broaching machines with spindle drives because the moving speeds can be increased with spindle drives because the moving speeds can be increased while avoiding possible vibrations of the spindle drive and the table or platform.

It was found that it is particularly advantageous if the synchronously driven spindles of these spindle drives are supported between their two oppositely oriented threaded sections. This counteracts possible vibrations during their operation. The driving couplings can be realized within this area.

The structural length or structural height of the broaching machine can be reduced by having the broaching tool be displaceable in the axial direction.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements through the several views.

DETAILED DESCRIPTION OF THE PREFERRED EMBODIMENT

Figure 1:
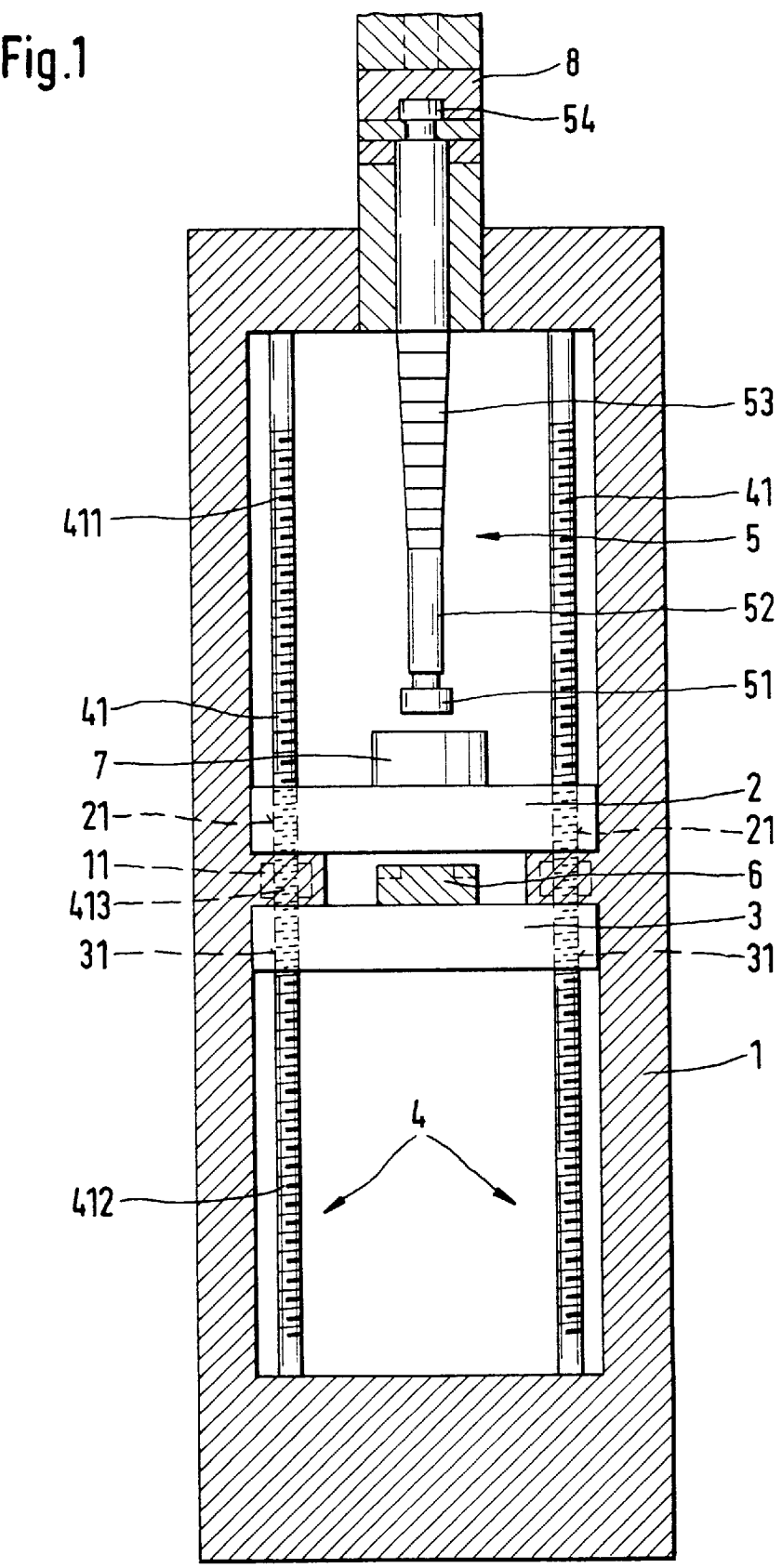
FIG. 1 shows a side view of the broaching machine according to the invention before coupling of the broaching tool into the platform through the workpiece.

Referring now in detail to the drawings and, in particular, FIG. 1, there is shown the machine frame 1 of a vertically arranged broaching machine with a broaching tool 5 operating vertically. A machine table 2 and a platform 3 each are mounted on and coupled to and driven by oppositely oriented threaded sections 411 and 412 on the two or more spindles 41 of a motor-driven spindle drive 4. Mating threaded bores 21 and, respectively, 31, are disposed in table 2 and platform 3 so that when spindles 41 are driven, table 2 and platform 3 each perform oppositely directed movements. Both spindles 41 are controlled synchronously via a common drive.

Spindles 41 are guided in bearings 11 on the side of the machine frame by means of a central, unthreaded bearing section 413.

In its starting position according to FIG. 1, the broaching tool denoted as a whole by reference numeral 5 is detachably received with its end-piece 54 in an end-piece holder of its driving unit 8. At the other end, broaching tool 5 has a shaft 51, which can be non-positively and positively coupled to a pliers-like shaft holder 6, which is connected with platform 3. Shaft 51 is adjoined by an insertion section 52, which inserts the broaching tool in the bore to be machined in workpiece 7 which is centered on table 2. Insertion section 52 is followed by the relatively long broaching section 53 of the tool, via which the actual broaching work is carried out on workpiece 7.

Figure 2:
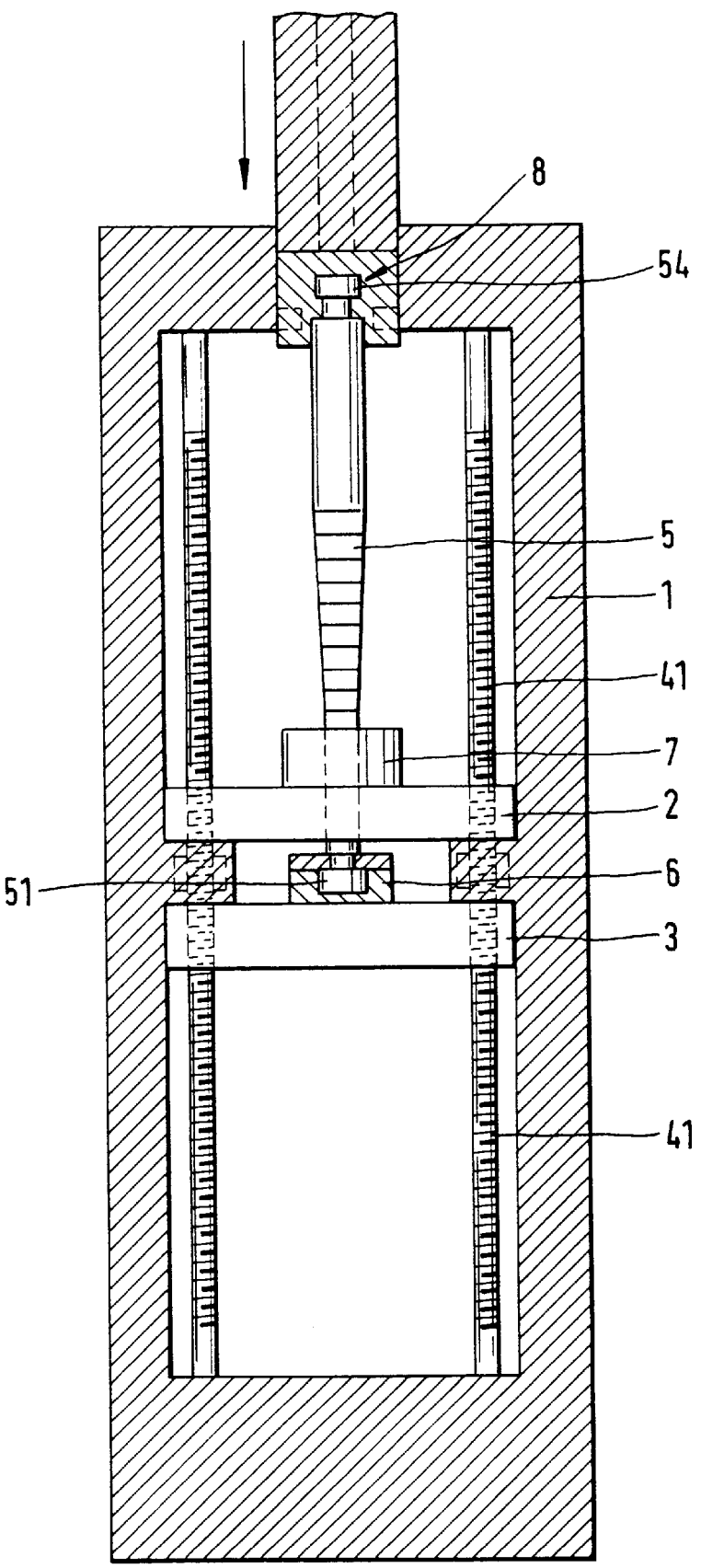
FIG. 2 shows a side view of the machine after the broaching tool has penetrated the workpiece and the table with the platform in the coupled position.
Figure 3:
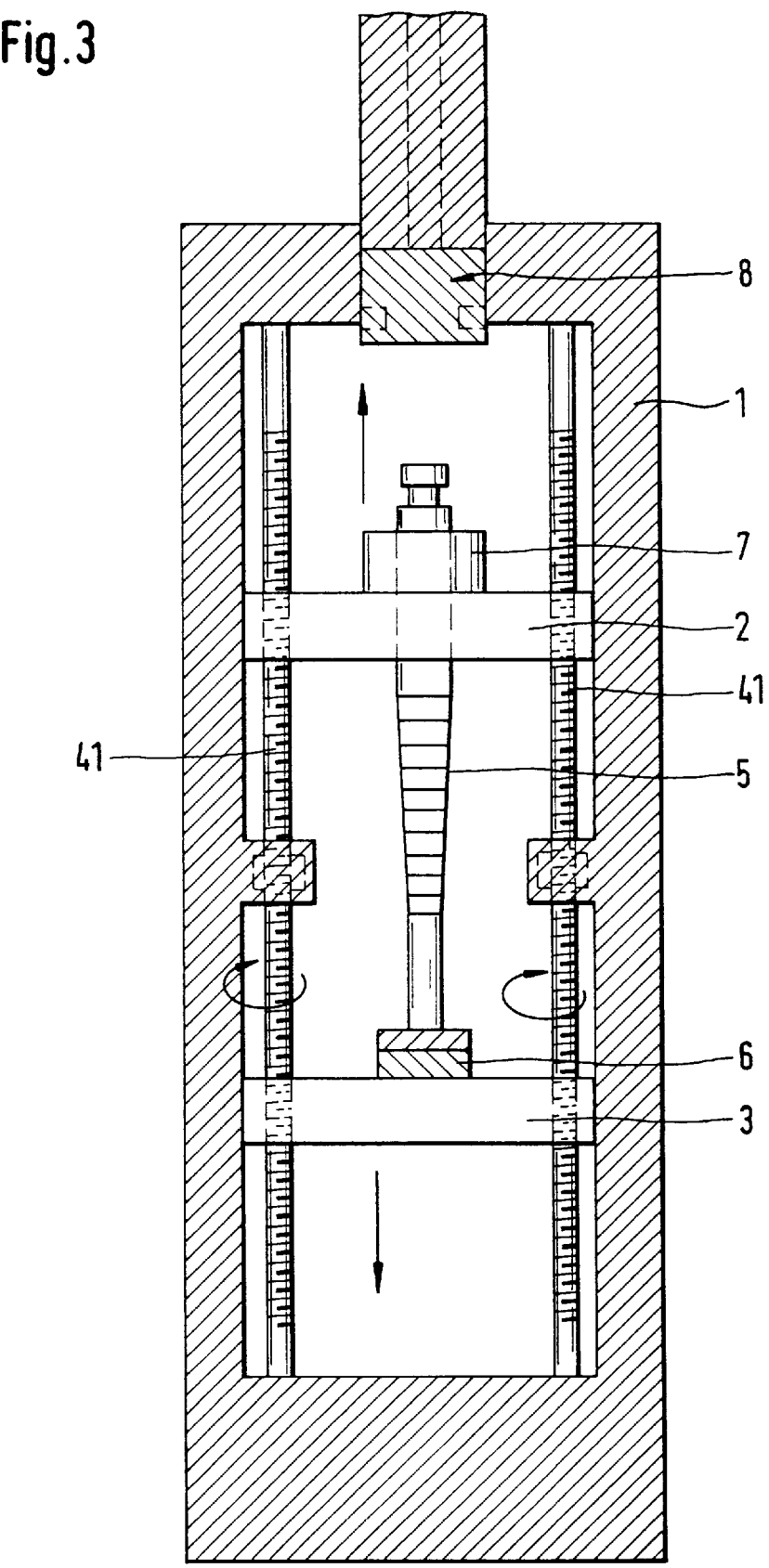
FIG. 3 shows a side view of the arrangement of the machine elements after the process for machining the workpiece has been completed.

FIG. 2 shows that broaching tool 5 is driven via driving unit 8 through workpiece 7 and table 2 until shaft 51 is coupled to or in shaft holder 6. Table 2 and platform 3 remain in the starting position shown as broaching tool 5 is being advanced.

After broaching tool 5 has been decoupled from its driving unit 8 or the end-piece holder received therein, platform 3 and machine table 2 are oppositely displaced via spindle drive 4 or associated spindles 41 with their oppositely oriented threaded sections 411 and 412. Workpiece 7 is machined as the table and the platform are being displaced. In the present case, workpiece 7 is machined on the inside. From their starting positions shown in FIG. 2, for example, table 2 and platform 3 each are oppositely moved (or driven) by half of the operating or working distance of broaching tool 5.

Figure 4:
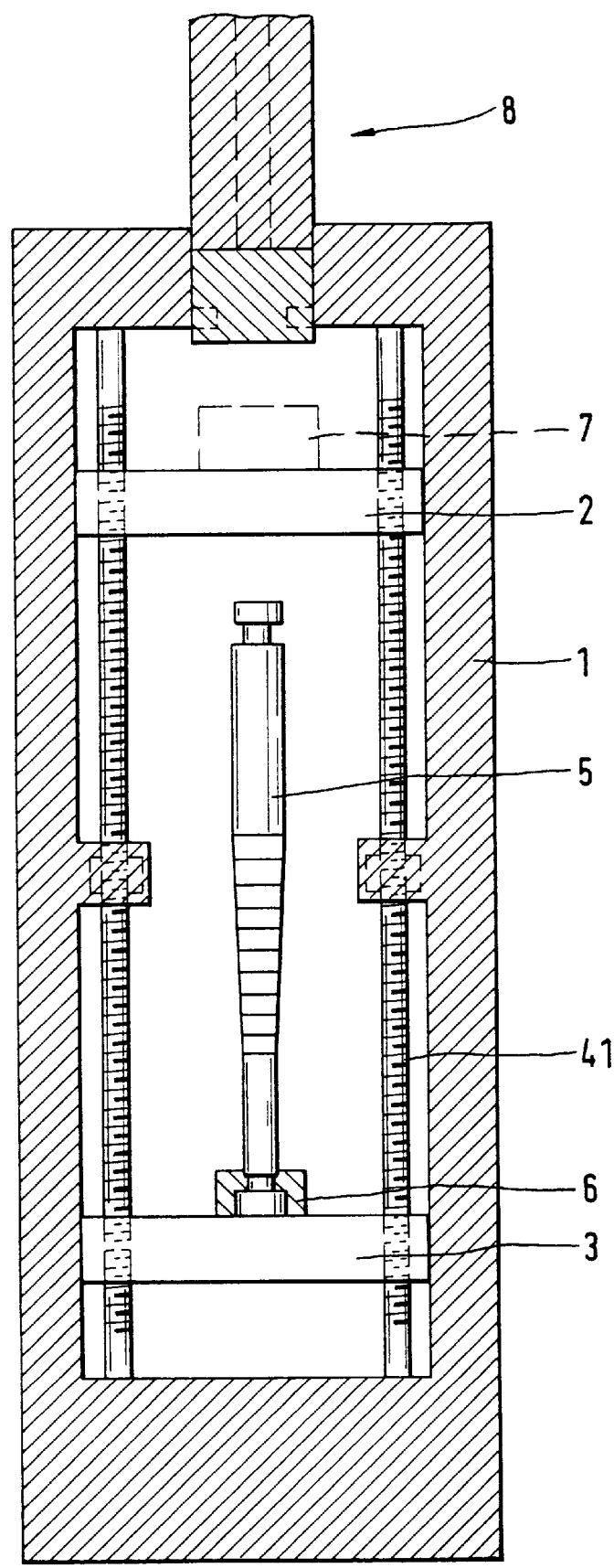
FIG. 4 shows a side view of the arrangement after the table and the platform have been returned (retracted) for releasing the machined workpiece.

After workpiece 7 has been completely machined, table 2 and the platform are further driven apart in opposite directions at least until workpiece 7 has been released by broaching tool 5 and thus can be removed. This situation is shown in FIG. 4.

Figure 5:
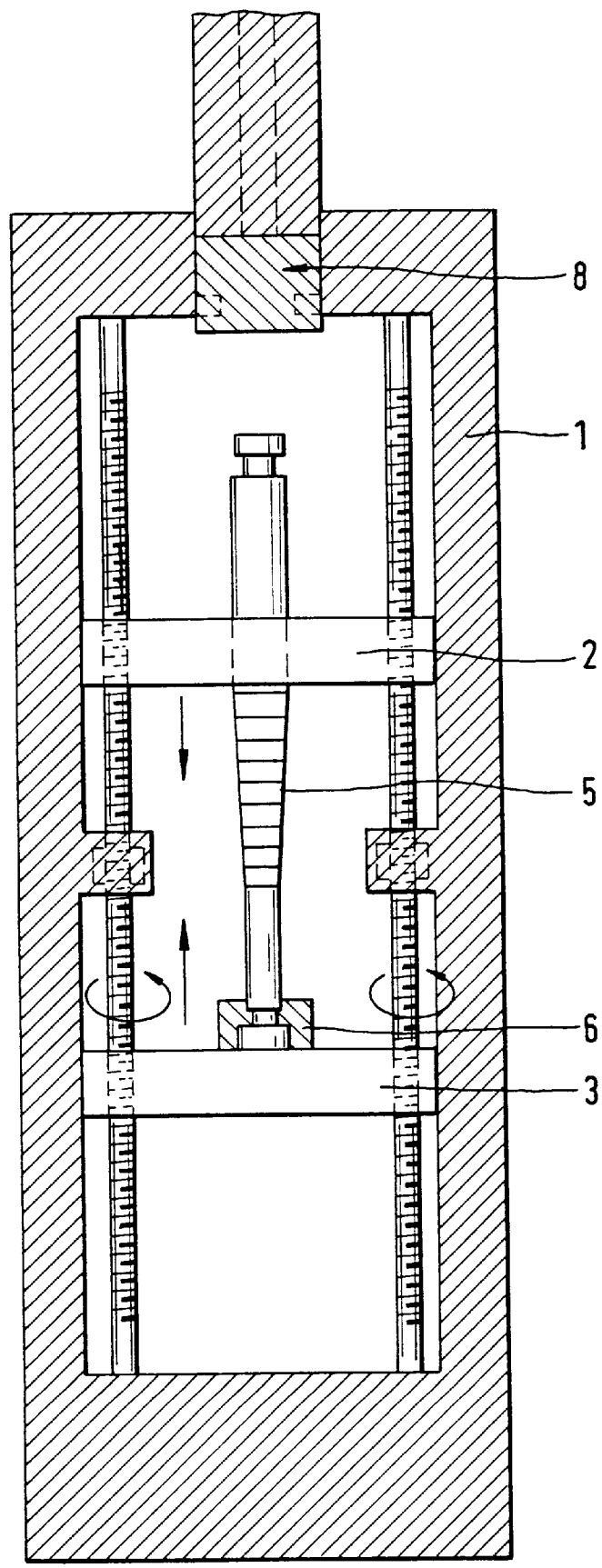
FIG. 5 shows the returning process of both elements before the broaching tool is coupled to its driving unit on the frame of the machine.

According to FIG. 5, table 2 and platform 3 are again oppositely driven against each other after workpiece 7 has been removed. Broaching tool 5 is subsequently coupled again with the end-piece holder on driving unit 8. The machine drives again into the starting position according to FIG. 1, where it can be loaded again with a workpiece to be machined.

The broaching machines are suitable also for employing several broaching tools operating in parallel for machining one or a plurality of workpieces.

Accordingly, while only one embodiment of the present invention has been shown and described, it is obvious that many changes and modifications may be made thereunto without departing from the spirit and scope of the invention.

What is claimed is:

1. A broaching machine, comprising:
   a machine frame;
   a machine table for receiving a workpiece, said table being mounted on said machine frame;
   a platform mounted on said machine frame and being displaceably driven relative to said table;
   at least one broaching tool adapted to be connected with said platform and operating in the axial direction;
   wherein the machine table and the platform are simultaneously displaced, driven in oppositely oriented directions.

2. The broaching machine according to claim 1, wherein the machine table and platform are driven via a common spindle drive having spindles with two oppositely oriented threaded sections, and wherein the machine table and the platform each are mounted on and driven by one of the two oppositely oriented threaded sections.

3. The broaching machine according to claim 2, wherein the spindles are supported between their two oppositely oriented threaded sections.

4. The broaching machine according to claim 2, wherein the spindles are driven synchronously between the two threaded sections.

* * * * *